(12) United States Patent
Bacastow

(10) Patent No.: US 7,841,534 B2
(45) Date of Patent: Nov. 30, 2010

(54) APPARATUS AND METHOD FOR POS PROCESSING

(75) Inventor: Steven V. Bacastow, Cumming, GA (US)

(73) Assignee: QuickVault, Inc., Cumming, GA (US)

( * ) Notice: Subject to any disclaimer, the term of this patent is extended or adjusted under 35 U.S.C. 154(b) by 207 days.

(21) Appl. No.: 12/283,644

(22) Filed: Sep. 15, 2008

(65) Prior Publication Data

US 2009/0150247 A1    Jun. 11, 2009

Related U.S. Application Data

(63) Continuation of application No. 11/141,837, filed on Jun. 1, 2005, now Pat. No. 7,464,862.

(60) Provisional application No. 60/579,997, filed on Jun. 15, 2004, provisional application No. 60/631,300, filed on Nov. 24, 2004.

(51) Int. Cl.
*G06K 7/10* (2006.01)
(52) U.S. Cl. .................. 235/472.02; 345/752; 705/14; 711/103
(58) Field of Classification Search ............ 235/472.02; 345/752; 705/14; 711/103
See application file for complete search history.

(56) References Cited

U.S. PATENT DOCUMENTS

| | | | |
|---|---|---|---|
| 5,331,136 A | 7/1994 | Koenck et al. |
| 5,696,909 A | 12/1997 | Wallner |
| 5,844,776 A | 12/1998 | Yamaguchi et al. |
| 5,979,753 A | 11/1999 | Roslak |
| 6,003,008 A | 12/1999 | Postrel et al. |
| 6,062,478 A | 5/2000 | Izaquirre et al. |
| 6,546,441 B1 | 4/2003 | Lum |
| 6,553,348 B1 | 4/2003 | Hashimoto |
| 2002/0082925 A1 | 6/2002 | Herwig |
| 2002/0193157 A1 | 12/2002 | Yamada |
| 2003/0135148 A1 | 7/2003 | Shekhar et al. |
| 2003/0174167 A1 | 9/2003 | Poo et al. |
| 2005/0149394 A1 | 7/2005 | Postrel |
| 2007/0143529 A1 | 6/2007 | Bacastow |
| 2007/0214047 A1 | 9/2007 | Antonello |

*Primary Examiner*—Allyson N Trail
(74) *Attorney, Agent, or Firm*—King & Spalding LLP

(57) ABSTRACT

An apparatus and method for configuring, altering, controlling, securing, and extending the processing capability and functionality of PCs and POS devices using a non-volatile memory device using software and data carried within the apparatus.

8 Claims, 2 Drawing Sheets

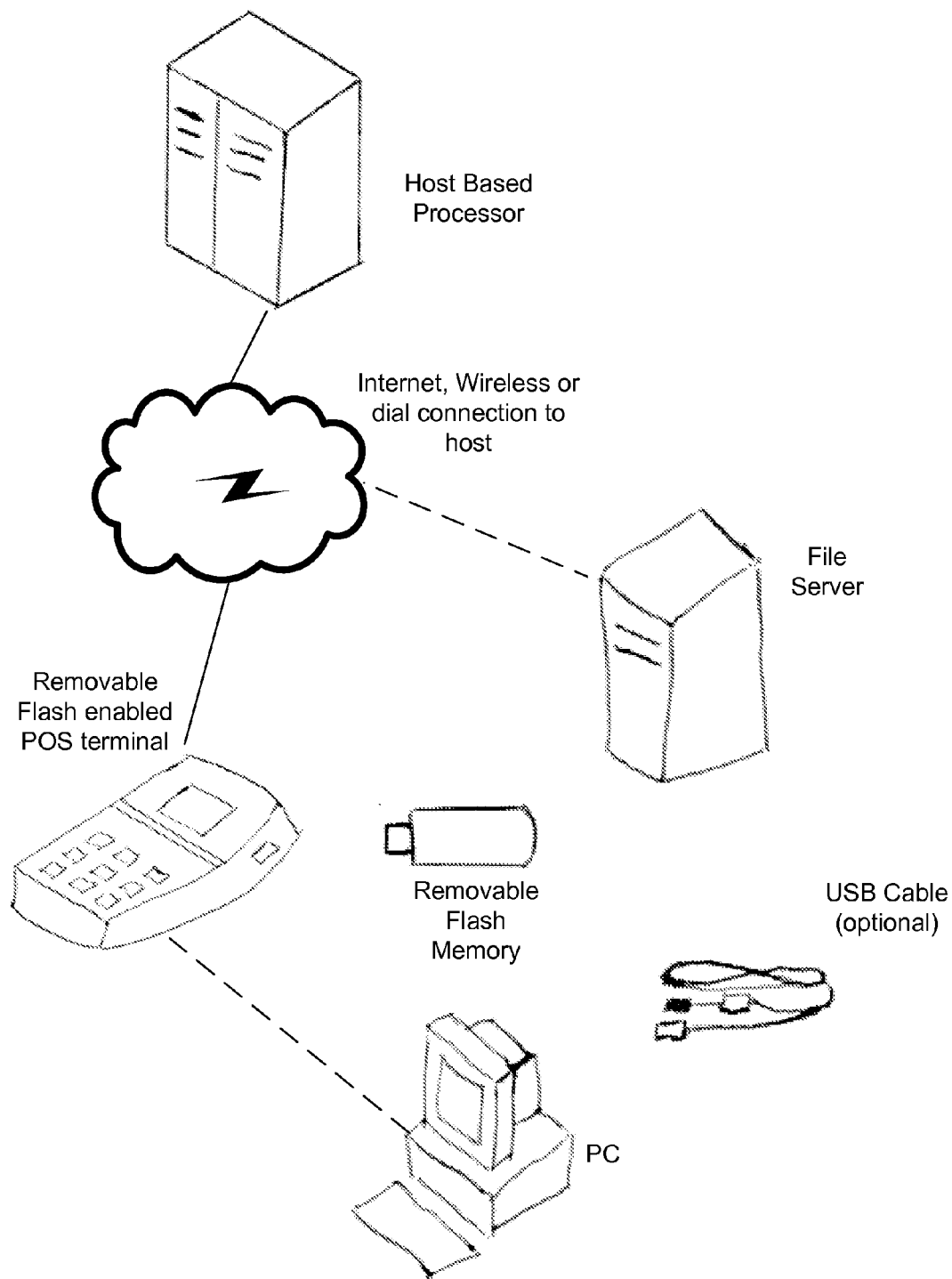
Figure 1 – Component List

Figure 2 – Basic Configuration
Removable Flash enabled POS terminal
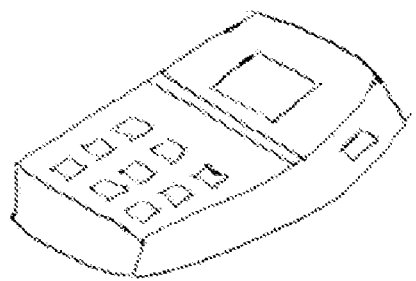
Removable Flash Memory

APPARATUS AND METHOD FOR POS PROCESSING

RELATED APPLICATIONS

This application is a continuation of and claims priority to U.S. patent application Ser. No. 11/141,837, filed Jun. 1, 2005 now U.S. Pat. No. 7,464,862, and entitled "Apparatus and Method For POS Processing," which claims priority to U.S. Provisional Patent Application Ser. Nos. 60/579,997 filed Jun. 15, 2004 and 60/631,300 filed Nov. 24, 2004. The content of all of these prior applications is hereby fully incorporated herein by reference.

COPYRIGHT NOTICE

A portion of the disclosure of this patent document may contain material, which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

FIELD OF THE INVENTION

The present invention relates to an apparatus and method for enhancing the functionality and security of point-of-sale terminals through the use of a portable non-volatile memory device using software and data carried within the device.

BACKGROUND OF THE INVENTION

In recent years, point-of-sale (POS) terminals and the software that supports POS business applications have become increasingly complex. New 'modular' applications have been developed to capitalize on the new POS terminal capabilities and serve to increase the utility value of the point-of-sale terminal. Concurrently, the internet has provided an opportunity to increase the communication bandwidth to the POS terminals, again increasing the type of functionality and transactions that can be supported. However, the POS terminals themselves lack the capacity to store large amounts of data and the business applications available to POS terminals are therefore limited.

The number of merchants, terminals and transactions is increasing annually. Along with these increases, there has been an increase in fraud at the point-of-sale. Current methods fail to adequately prevent consumer and merchant fraud from occurring at the point-of-sale. Authenticating transactions originating from POS devices using secure tokens, digital certificates and other unique merchant identifiers used to control or limit individual user access and functionality are not easily supported by conventional methods.

Also, the process of configuring the POS terminal to function in accordance with the merchant's needs and approved transactions is becoming increasingly complex and time consuming. One drawback to conventional methods for configuring POS devices is related to the current method of downloading the POS business application programs (eg. restaurant, retail, lodging, mail order, petroleum) and the merchant-specific configuration attributes (eg. Bar-tabs, tips, merchant-id, terminal-id, American Express SE number). Current methods rely on transferring (i.e. downloading) this information over dial or high-speed connections with a host-based system. The process is very time consuming, error prone and therefore expensive.

Another drawback to conventional methods for introducing new products to the market is related to the fact that the POS business applications must first be certified by the credit card processors (such as Vital Processing, Nova Information Systems, Global Payments, RBS Lynk, First Data) in advance of commercial use. Certification must be completed separately by each processor for each type of POS terminal and business application prior to the device being approved for sale and support (as a 'Class-A' product). This certification process is generally manual in nature, time consuming and expensive and often requires 6 to 12 months per each business application. Any single change such as a line of source code (or for example an additional module added) to a business application requires that, the certification process start over again. POS terminal manufacturers (i.e. Verifone, Hypercom, Ingenico, others) are therefore constrained in their ability to sell and distribute new POS terminal models until the business applications are certified (and therefore supported) by the major processors. This scenario creates friction in the distribution channel as the manufacturers seek to gain market share with new innovative equipment because it requires them to wait for each of the major processors (i.e. First Data, Vital Processing, Global Payments, Nova Information Systems, RBS Lynk, others) to first certify the business applications.

Finally, because of the high cost of the device and the security requirements, the POS terminal industry is generally constrained to sell terminals and software only for use by approved merchants and they do not typically sell terminals directly to consumers for use at the home or office.

The price of non-volatile (flash) memory is rapidly decreasing while the capacity and available is increasing. The next generation of POS devices will support non-volatile, detachable flash memory from serial, USB, and other methods. In fact, POS manufacturers are in the very beginning stages of supporting USB devices on POS terminals and there are no commercial uses of this technology today on POS devices. Computer programs (i.e. Business Applications) can and should be developed to enhance the utility value, functionality and security of these next generation POS devices. It will be difficult for the industry to embrace this new technology using current methods.

Therefore, a need exists for an apparatus and method that addresses these shortcomings in the prior art by utilizing the new capabilities provided through non-volatile, removable flash memory.

SUMMARY OF THE INVENTION

The present invention answers these needs by providing an apparatus and method for configuring, altering, controlling, securing, and extending the processing capability and functionality of POS devices using a non-volatile memory device using software and data carried within the device.

According to the present invention design, a portable housing is provided with non-volatile memory inside. An interface is provided on the housing for communication between the non-volatile memory and the Removable Flash Enabled POS Device. Business software applications and configuration data are loaded into the non-volatile memory. The software applications can be loaded into the non-volatile memory by the POS terminal manufacturer, the Independent Sales Organization (ISO), by a payment processing company, or by the Merchant via a CD-ROM, the Internet, or other suitable means.

Because the software 'business applications' and configuration data 'merchant specific attributes' reside (either fully or partially) on the removable storage device (non-volatile memory) and not on fully on the POS terminal (current industry standard), the present invention may be used to configure and inter-operate with multiple POS devices.

It is thus an advantage of the present invention to provide an apparatus and method for quickly configuring, enhancing, controlling, securing, or extending the functionality of a Removable Flash Enabled POS Device without time consuming and expensive software modifications or host-based download processes. To this end, the present invention is highly portable, operates independently of any particular POS terminal, and is compatible with a wide variety of POS terminal devices.

Embodiments of the present invention are described below by way of illustration. Other approaches to implementing the present invention and variations of the described embodiments may be constructed by a skilled practitioner and are considered within the scope of the present invention.

BRIEF DESCRIPTION OF THE DRAWINGS

FIG. 1 is an overview of the primary components which would be required to support all of the invention embodiments. Components include: (1) Removable-Flash Enabled POS Device; (2) Removable Flash Memory; (3) Dial-up, Wireless, or High-speed internet connection to Host Processor, (4) Host Processor; (5) Cable; (6) File Server; (7) Personal Computer.

FIG. 2 is an overview of the basic required components which would be required to support a limited set of the invention embodiments. Components include: (1) Removable Flash Enabled POS Device; (2) Removable Flash Memory.

DETAILED DESCRIPTION OF THE INVENTION

As illustrated in FIG. 1, in one exemplary embodiment, the invention comprises a host based processor used for transaction authorization and clearing and downloading information to the removable flash memory. The exemplary embodiment illustrated in FIG. 1 also comprises a removable flash memory containing programs and data, as well as an interface that may be USB or another method. The exemplary embodiment shown in FIG. 1 further comprises a PC used to store information collected on removable flash memory. As illustrated in the exemplary embodiment shown in FIG. 2, the removable flash enabled POS terminal can process certain transactions in an offline mode when there is no connection to the host processor. Furthermore, the removable flash memory contains programs and data that interoperate with the enabled POS terminal. The data stored in the removable flash memory can include inventory, pricing, negative files, music, games, batched transactions, control totals and other related data which would normally exceed the capacity of the POS terminal.

An embodiment of the invention allows for the secure storage of any persistent data (data of a permanent nature until changed or deleted) onto [FIG. 1: Removable Flash Memory]. This persistent data may be related to POS terminal configuration and, or transaction data. This data volume currently exceeds the storage capacity of the POS device [FIG. 1: Removable Flash Enabled POS Device] and therefore limits the utility value and overall functionality of the device to the merchant.

An embodiment of the invention allows for the tracking of cardholder and related customer transaction activity on the [FIG. 2: Removable Flash Memory] for the purpose of gift and loyalty program tracking without the need for an online, host-based connection.

An embodiment of the invention allows for the storage of known lost, stolen or fraudulent credit card and debit card numbers on the [FIG. 2: Removable Flash Memory], to prevent the use of these cards for POS transactions without the need for a host-based online connection (or in an offline mode). In connection with this embodiment, merchant-specific, employee-specific or location-specific fraud rules and limits may be defined and enforced without the need for an online connection to a host.

An embodiment of the invention allows for the immediate configuration of a new or reconfiguration of a POS terminal device shown in [FIG. 2—Removable Flash Enabled POS Device] using data and programs stored on the [FIG. 2: Removable Flash Memory] without the need to dial, download or connect the POS terminal with a central, host-based configuration process.

An embodiment of the invention allows for the storage of daily transaction totals on the [FIG. 1: Removable Flash Memory] for internal control, balancing, and reconcilement purposes using the [FIG. 1: PC or FIG. 1: File Server].

An embodiment of the invention allows for the secure storage of daily transactions (or batches of transactions) on the [FIG. 1: Removable Flash Memory] for the subsequent submission or 'uploading' to a host-based authorization system [FIG. 1: Host] and, or a local PC-based reporting process as shown in [FIG. 1: Personal Computer] or [FIG. 1: File Server].

An embodiment of the invention allows for the creation of authorized users and passwords for the merchant-specific POS device and would therefore require the [FIG. 1: Removable Flash Memory] to be connected to the POS device [FIG. 1: Removable Flash Enabled POS Device] prior to use and during use. This embodiment will also serve to control the functionality of the device [FIG. 1: Removable Flash Enabled POS Device] for specific users and therefore act as a 'key' to this POS device.

An embodiment of the invention allows for protection of files and data stored on the POS device [FIG. 1: Removable Flash Enabled POS Device] or the removable storage device [FIG. 1: Removable Flash Memory] through the use of an encryption method which is compliant with current payment industry security standards set by Visa (i.e. CISP), MasterCard, and American Express.

An embodiment of the invention allows for the merchant-specific configuration of a POS device [FIG. 1: Removable Flash Enabled POS Device] to be backed up onto [FIG. 1: Removable Flash Memory] and restored onto another identical POS device.

An embodiment of the invention allows for an independent audit or sampling of POS transactions from [FIG. 1: Removable Flash Enabled POS Device] onto [FIG. 1: Removable Flash Memory] for use by internal or external auditors as part of Sarbanes Oxley or related internal control requirements.

An embodiment of the invention provides a mechanism for capturing signatures and receipts from the POS device [FIG. 1: Removable Flash Enabled POS Device] onto [FIG. 1: Removable Flash Memory] which can be later transferred to [FIG. 1: Personal Computer] or [FIG. 1: File Server] and used for customer service, charge-back research and other related value-add purposes.

An embodiment of the invention provides a mechanism for capturing check images and check data from [FIG. 1: Removable Flash Enabled POS Device] and storing this information onto [FIG. 1: Removable Flash Memory] formatted in compliance with Check 21 and, or NACHA's ARC requirements. This data can subsequently be transferred to [FIG. 1: Personal Computer] or [FIG. 1: File Server] or [FIG. 1: Host] and used for financial transaction fulfillment, clearing other related purposes.

An embodiment of the invention provides a mechanism for storing and retrieving HTML and similar presentation content on the [FIG. 1: Removable Flash Memory] as required to format screens on [FIG. 1: Removable Flash Enabled POS Device].

An embodiment of the invention provides a means to store onto the [FIG. 1: Removable Flash Memory] and display marketing presentations such as flash or video presentations on the screen of the POS device [FIG. 1: Removable Flash Enabled POS Device].

An embodiment of the invention provides a means to conduct customer surveys on [FIG. 1: Removable Flash Enabled POS Device] and collect and store survey results on [FIG. 1: Removable Flash Memory]. This data can subsequently be transferred to [FIG. 1: Personal Computer] or [FIG. 1: File Server] or [FIG. 1: Host] and used for customer service other related purposes.

An embodiment of the invention provides a means of storing product catalogs, inventory levels and pricing on [FIG. 1: Removable Flash Memory] or [FIG. 2: Removable Flash Memory] to allow customers to shop at the POS terminal [FIG. 2: Removable Flash Enabled POS Device] while in an offline mode. This inventory data can subsequently be transferred to [FIG. 1: Personal Computer] or [FIG. 1: File Server] or [FIG. 1: Host] and used for updating central inventory, re-order and other related purposes.

An embodiment of the invention allows for local "stand-in" processing using data, logic and rules contained within the [FIG. 2: Removable Flash Memory] to authorize transactions when the host is down in lieu of (or in addition to) traditional voice authorizations. In connection with this embodiment, the locally authorized transactions would be uploaded to the host [FIG. 1: Host Processor] automatically whenever the online connection is restored.

An embodiment of the present invention provides a means of storing onto [FIG. 1: Removable Flash Memory] and dispensing coupons from [FIG. 1: Removable Flash Enabled POS Device] to customers in order to encourage repeat sales and to calculate discounts on sale items for qualifying customers.

An embodiment of the invention allows for music and games to be stored on to [FIG. 1: Removable Flash Memory] and played through the POS device [FIG. 1: Removable Flash Enabled POS Device].

An embodiment of the invention allows for the configuration of a virtual private network (VPN) or similar secure network over the [FIG. 1: Dial-up, Wireless or High-speed Internet connection to Host] to facilitate authentication to the network's processor [FIG. 1: Host Processor]. This embodiment also supports other advanced security mechanisms which otherwise would not be supportable by the POS device. In connection with this embodiment, a secure token, digital certificate, encryption key or other unique identifier is permanently stored on the non-volatile memory device [FIG. 1: Removable Flash Memory] and released to the payment network to authenticate each session and, or transaction.

An embodiment of the invention facilitates the transfer (such as downloading from the internet or a wireless network) of large files (such as but not limited to: inventory levels, pricing, negative card files, bin tables, music, games, marketing presentations, etc.) through the connection POS device [FIG. 1: Removable Flash Enabled POS Device] over high-speed connections [FIG. 1: Dial-up, Wireless, or High-speed internet connection to Host Processor] and stored directly onto [FIG. 1: Removable Flash Memory].

An embodiment of the current invention would allow the POS device to route payment or non-payment transactions based on bin tables (and related rules) that are stored on the removable device. In connection with this embodiment, these bin tables would be updated periodically thought a connection such as [FIG. 1: Dial-up, Wireless, or High-speed internet connection to Host Processor] or via CD ROM.

An embodiment of the invention integrates a Personal Computer with a POS device for merchant or home users. Connectivity would be provided to the non-volatile flash memory [FIG. 1: Removable Flash Memory] to create an interoperable application that fully leverages the capabilities of the PC [FIG. 1: PC]. In connection with this embodiment, a merchant or consumer will be able to initiate a card-centric (swipe and signature/or pin-based) financial transaction from their home or business using the [FIG. 1: Removable Flash Memory] and without the need for a separate POS device. This embodiment also creates a potentially huge new market for accepting secure payment transactions from millions of existing and future PCs.

An embodiment of the invention would allow consumer credit card, pre-paid card, gift card, and other related personal account information to be securely stored on a consumer's personal non-volatile memory device (such as a USB flash memory device) [FIG. 1: Removable USB Flash Memory] and accessed by the POS terminal [FIG. 1: Removable Flash Enabled POS Device] when inserted into the POS terminal or via RFID. This embodiment would therefore replace the need for the consumer to provide a magnetic-stripe, smart-card or other card-centric payment device.

Having thus described the invention in detail, it should be apparent that various modifications and changes may be made without departing from the spirit and scope of the present invention. Consequently, these and other modifications are contemplated to be within the spirit and scope of the following claims.

I claim:

1. An apparatus for extending the capabilities of a POS device comprising:
   a. a portable housing;
   b. a nonvolatile memory within the housing;
   c. an interface on the housing for communication between the non-volatile memory and the POS device;
   d. a software application in the non-volatile memory operable to process financial transactions without the processing occurring via a network, wherein the software application is executed directly from the nonvolatile memory; and
   e. a database in the non-volatile memory to store data to support the software application.

2. The apparatus of claim 1, wherein upon the availability of a network connection the software application instructs the POS device to route payment and non-payment transactions based on bin tables and rules that are stored in the database in the nonvolatile memory.

3. The apparatus as defined in claim 1, wherein the portable housing may be a USB flash drive, a mobile phone, a PDA or other communication device with a nonvolatile memory.

4. The apparatus as defined in claim 1, wherein the interface on the housing supports wireless communication with the POS device.

5. An apparatus for extending the capabilities of a PC, including to function as a POS device, comprising:
   a. a portable housing;
   b. a nonvolatile memory within the housing;
   c. an interface on the housing for communication between the nonvolatile memory and the PC;
   d. a software application in the nonvolatile memory operable to process financial transactions without the processing occurring via a network, wherein the software application is executed directly from the nonvolatile memory; and
   e. a database in the non-volatile memory to store data to support the software application.

6. The apparatus as defined in claim 5, wherein upon the availability of a network connection the software application instructs the PC to route payment or non-payment transactions based on bin tables and rules that are stored in the database in the nonvolatile memory.

7. The apparatus as defined in claim 5, wherein the portable housing may be a USB flash drive, a mobile phone, a PDA or other communication device with a nonvolatile memory.

8. The apparatus as defined in claim 5, wherein the interface on the housing supports wireless communication with the PC.

* * * * *